(12) United States Patent
Hool

(10) Patent No.: US 6,886,866 B1
(45) Date of Patent: May 3, 2005

(54) MANIFOLD FEATURING IDENTICALLY SHAPED CONNECTION PORTS WITH FEATURES TO PREVENT MISASSEMBLY

(75) Inventor: Pat H. Hool, St. Clair, MI (US)

(73) Assignee: Kelsey-Hayes Company, Livonia, MI (US)

( * ) Notice: Subject to any disclaimer, the term of this patent is extended or adjusted under 35 U.S.C. 154(b) by 186 days.

(21) Appl. No.: 10/402,001

(22) Filed: Mar. 28, 2003

(51) Int. Cl.$^7$ ................................................ F16L 35/00

(52) U.S. Cl. ....................................................... 285/18

(58) Field of Search ..................................... 285/18, 39

(56) References Cited

U.S. PATENT DOCUMENTS 4,076,279 A * 2/1978 Klotz et al. ................... 285/26
4,643,459 A * 2/1987 Carson ........................ 285/84

* cited by examiner

*Primary Examiner*—John Fox
(74) *Attorney, Agent, or Firm*—MacMillan, Sobanski & Todd, LLC (57) ABSTRACT

A fluid manifold defining a body has a surface defining a plane. A bore extends into the body from the surface and defines a seat. The bore is adapted to receive a tube nut into a seated position against the seat. A first tube nut and a second tube nut having respective bodies with first and second lengths and first and second flanges positioned at one end of each body are provided. A tube nut stop is disposed adjacent the bore and is sized to engage the flange of the first tube nut when placed into the manifold at the bore, thereby preventing the first tube nut from being seated against the seat. The tube nut stop is of insufficient size to engage the flange of the second tube nut when seated against the seat in the bore, thereby allowing the second tube nut to be seated against the seat.

15 Claims, 6 Drawing Sheets

MANIFOLD FEATURING IDENTICALLY SHAPED CONNECTION PORTS WITH FEATURES TO PREVENT MISASSEMBLY

BACKGROUND OF THE INVENTION

It is desirable that designers design articles in a manner that provides for foolproof assembly of articles of manufacture. A term borrowed from the Japanese to describe this method of design is "Poke-Yoke".

Many fluid manifolds, such as those used for hydraulic brake systems, utilize different diameter threaded ports for ports that are in close geometric proximity to each other. This allows for differentiation between different tubes that are to be connected to different circuits, thereby making assembly more foolproof (because it is impossible to connect a tube to the wrong port). Particularly, the foolproof design prohibits an associated tube nut from threading into the wrong bore. However, the use of different size bores requires more costly machining and requires the bores to be spaced farther apart to fit the spacing requirements of the larger of the tube fittings than would be required if all were uniform and of the smallest possible diameter.

SUMMARY OF THE INVENTION

A fluid manifold that has a surface defining a plane, at least two bores extending into the manifold from the surface, wherein each bore is adapted to receive a tube nut, a first tube nut with a body having a first length and a first flange positioned at one end of the body, a second tube nut with a body having a second length and a second flange positioned at one end of the body, and a tube nut stop disposed adjacent at least one of said bores. The tube nut stop is sized to engage the flange of the first tube nut when the first tube nut is placed into the manifold at the one of said bores thereby limiting the ability of the first tube nut to be placed into the one of said bores. The tube nut stop is also of insufficient size to engage the flange of the second tube nut when the second tube nut is placed into the one of said bores, thereby allowing the second tube nut to be placed into the one of said bores.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
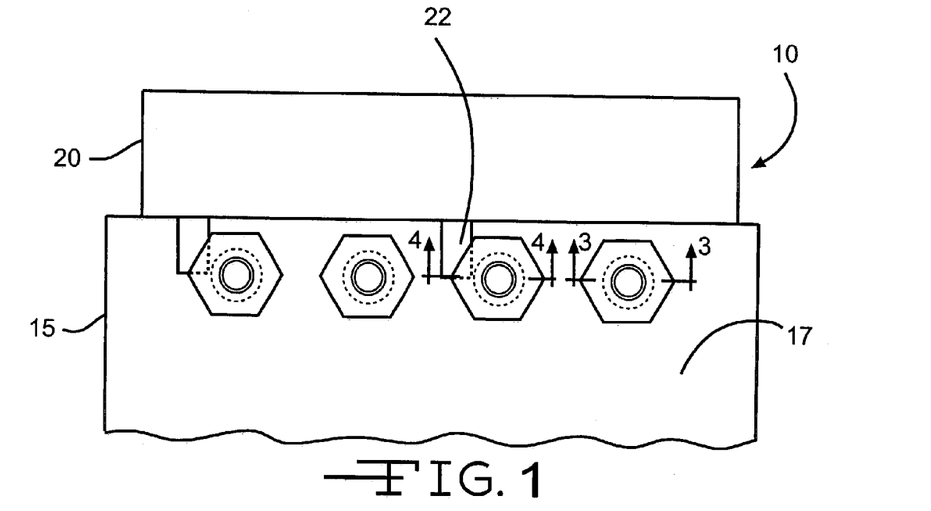
FIG. 1 is a top view of a hydraulic manifold featuring identical connection ports with tube nut stops for preventing misassembly in accordance with this invention.
Figure 2:
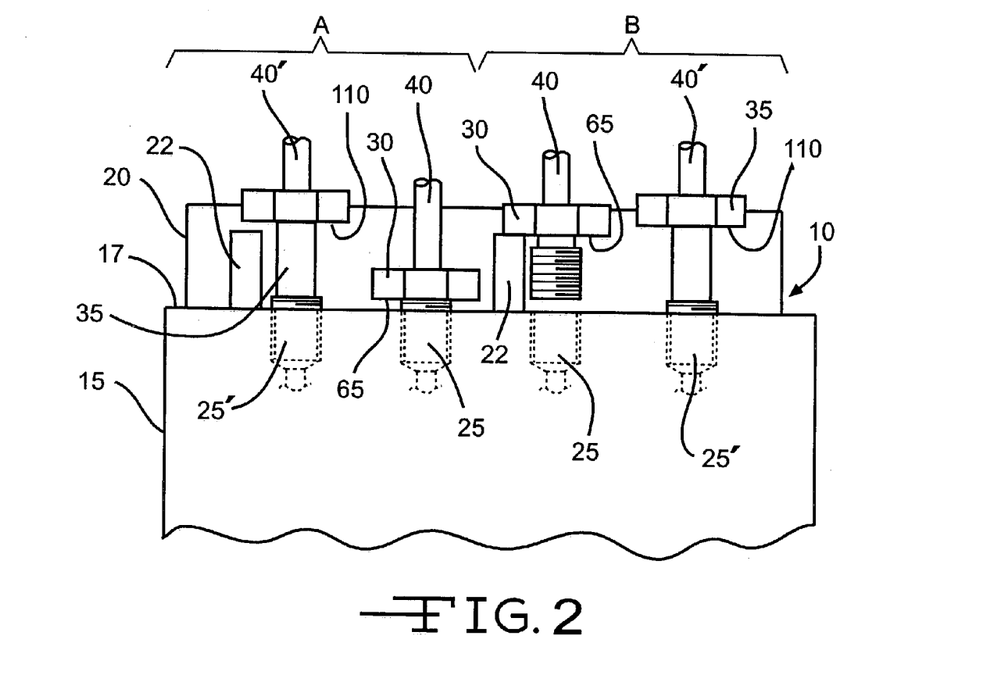
FIG. 2 is an elevation view of the front of the hydraulic manifold of FIG. 1.

Referring now to FIG. 1 and side A of FIG. 2, a hydraulic manifold is indicated generally at 10. The hydraulic manifold 10 is a hydraulic brake manifold that can be employed in the automotive industry. However, it will be appreciated, in light of the following disclosure, that the invention may be practiced on objects other than automotive hydraulic brake manifolds. For example, the manifold 10 may be a pneumatic manifold, an industrial fluid distribution manifold, a 3-way valve, or any other type of component where it is desirable to make the assembly of multiple fluid carrying tubes to the component more foolproof. For example, it would be desirable to make the assembly foolproof in a situation where the fluid carrying tubes might be subject to connection to a wrong port.

The exemplary hydraulic manifold 10 includes a hydraulic control unit (HCU) 15 and an electronic control unit (ECU) 20. The HCU 15 has a surface 17 that defines a plane. At least one stop 22 extends from the ECU 20 over the surface 17, and is thus out of plane with the surface 17. In a preferred embodiment the stop 22 is formed integrally with the exterior of the ECU 20. Thus, the stop 22 is formed of the same material as the ECU 20. However, it is contemplated that the stop 22 may be composed of any suitable material and formed in any suitable way and be attached to the ECU 20 by any suitable method.

Referring to FIG. 2, a plurality of bores 25 and 25' are formed in the HCU 15. Preferably, each of the bores is identically shaped. That is, the bores 25 and 25' have a uniform diameter and depth. Additionally, the bores 25 and 25' are provided with identical threads on the walls thereof, if threads are provided. Thus there is no difference physically to differentiate the bores 25 and 25' other than the fluid circuit (not shown) to which each bore is connected and the locations of the bores 25 and 25'. In contrast, a competing scheme for foolproofing utilizes a particular positional arrangement when the bores of different circuits are of a different diameter. If the circuits handle similar flows and pressures, such a scheme would require at least some bores to be larger than required just for mistake avoidance. Thus, with larger than required bores, the arrangement of bores in a component must be less compact than would be required if each bore was of uniform smallest possible size.

At least one first threaded connector in the form of a first tube nut 30 is provided. Each first tube nut 30 connects a respective tube 40 to the HCU 15 at a respective bore 25. At least one second threaded connector in the form of a second tube nut 35 is also provided. Each second tube nut 35 connects a respective tube 40' to the HCU 15 at a respective bore 25'. Each tube 40 and 40' provides a respective fluid passage connection between the HCU 15 and a respective remote hydraulic component (not shown), such as a vehicle brake.

Figure 3:
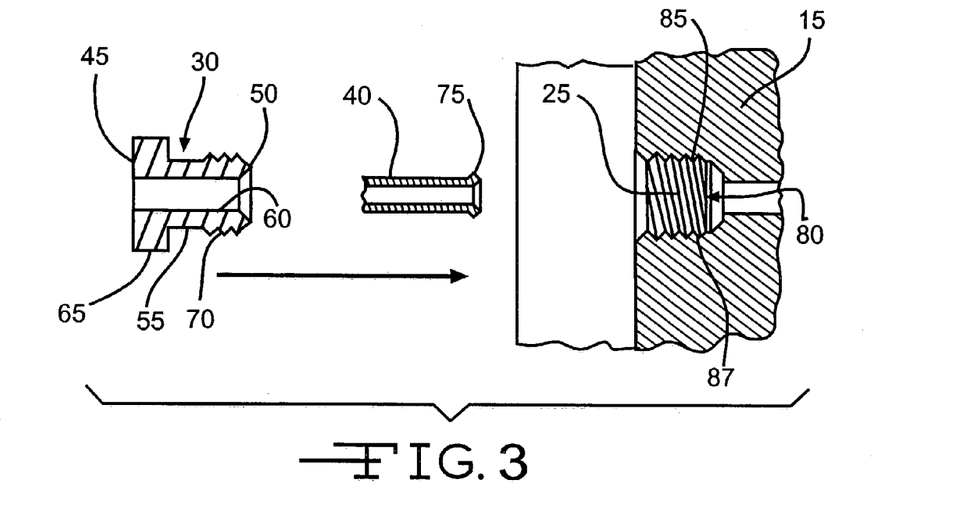
FIG. 3 is an exploded section view of the manifold taken along the line 3—3 of FIG. 1 and rotated 90° counterclockwise, of a first tube nut and an associated tube, with a flare, being assembled into an HCU.

Referring to FIG. 3, a generally hollow and cylindrical first tube nut is indicated generally at 30. The first tube nut 30 has a first end 45 and a second end 50. The first tube nut 30 has an exterior surface 55 and a radially outwardly extending flange 65. The flange 65 preferably has a plurality of flats or other tool engaging surface or surfaces formed on the exterior surface 55 at the first end 45 of the first tube nut 30. A plurality of threads 70 are formed on the exterior surface 55 adjacent the second end 50 of the first tube nut 30. It can be appreciated that the threads 70 can be formed along the entire length of the exterior surface 55 or only on a portion thereof. The first tube nut 30 also has an interior surface 60 defining a cylindrical bore through the tube nut 30 from the first end 45 to the second end 50. The interior surface 60 of the first tube nut 30 is adapted to receive the tube 40 therethrough.

The tube 40 preferably has an end 75 that is flared. As described herein, the term flared means an end having a diameter that is greater than the diameter of the body portion of the tube 40. However, one skilled in the art will appreciate that the end 75 of the tube 40 may be formed having any suitable shape. The bore 25 is adapted to receive the end 75 of the tube 40, as indicated generally at 80. A plurality of threads 87 is formed on the receiving surface 85 of the bore 25. The plurality of threads 87 in the bore 25 are engaged by the plurality of threads 70 of the first tube nut to threadably connect the first tube nut 30 to the HCU 15 at the bore 25.

Figure 4:
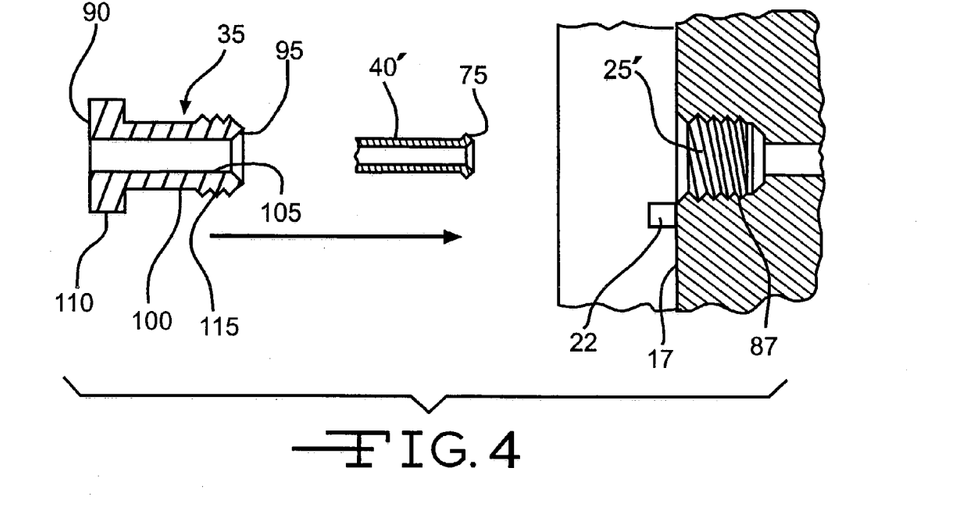
FIG. 4 is a view of the manifold similar to FIG. 3 taken along the line 4—4 of FIG. 1 and rotated 90° counterclockwise.

Referring to FIG. 4 the second tube nut, indicated generally at 35, is generally cylindrical and hollow in shape. The second tube nut 35 has a first end 90 and a second end 95. The second tube nut 35 has an exterior surface 100 and an interior surface 105. A flange 110 is formed on the exterior surface 100 of the second tube nut at the first end 90 of the second tube nut 35. A plurality of threads 115 are formed on the exterior surface 100 of the second tube nut 35 adjacent the second end 95 of the second tube nut 35. It can be appreciated that the threads 115 could be formed on the entire length of the exterior surface 100 or on only a portion of the exterior surface 105 of the second tube nut. The interior surface 105 of the second tube nut 35 is formed in such a way to receive the tube 40'. The plurality of threads 87 on the surface of the bore 25' engage the plurality of threads 115 on the second tube nut 35 to threadably connect the second tube nut 35 to the HCU 15 at the bore 25'. The second tube nut 35 is preferably longer than the first tube nut 30. Specifically, the distance between the flange 110 and the second end 95 of the second tube nut 35 is greater than the distance between the flange 65 and the second end 50 of the first tube nut 30.

The stop 22 extends over the surface 17 in such a way that when the second tube nut 35 is threadably connected to the HCU 15, the stop 22 is at least partially disposed between the flange 110 and the surface 17. The stop 22 preferably is of a height that the stop 22 does not interfere with the proper connection of the second tube nut 35 to the HCU 15 into the bore 25' adjacent the stop 22. The term "height" is meant to refer to the distance away from the surface 17 that the stop 22 extends and is not intended as a limitation on the orientation of the components. However, the stop 22 is of such a height that the stop 22 does not allow the connection of the first tube nut 30 to the HCU 15 at any bore 25' next to which the stop 22 has been placed.

For example, referring now to Side B of FIG. 2, during connection of the tubes 40 and 40' to the HCU 15 of the manifold 10, an assembler will threadably connect tube nuts 30 and 35 to the bores 25 and 25'. If the assembler attempts to (wrongly) thread the shorter tube nut 30 into the bore 25' with a tube nut stop 22 adjacent, the tube nut 30 will be prevented from engaging (or alternatively will only partially engage) the threads of bore 25'. Further, if the assembler attempts (wrongly) to connect the longer tube nut 35 into the bore 25 (without a tube nut stop 22 adjacent) when the tube nut 35 is sealed, there will be a noticeably large gap between the facing surfaces of the flange 110 of the longer tube nut 35 and the surface 17 of the HCU 15. But the assembler will have no trouble getting the correct tube nut 35 to thread into and seat in the bore 25 with a small space left between the facing surface of the stop 22 and the flange of the tube nut 35. Similarly, when the assembler correctly threads the tube nut 30 into the proper bore 25, the tube nut 30 will seat and stop driving in with only a small gap between the facing surfaces of the flange of tube nut 30 and the surface 17 of the HCU 15. Thus a misassembly of either of the tube nuts 30 or 35 will be readily recognizable during the connection process and can be quickly rectified.

It should be noted that there are two short and two long tube nuts shown in FIGS. 1 and 2. It is anticipated that the tubes 40 and 40' will be secured so that it is impossible for the first tube nuts 30 and the second tube nuts 35 to reach another bore intended for the same size tube nut. However, as will described below in more detail, particularly with reference to FIG. 10, it is possible to avoid this potential misassembly by using other means.

Figure 5:
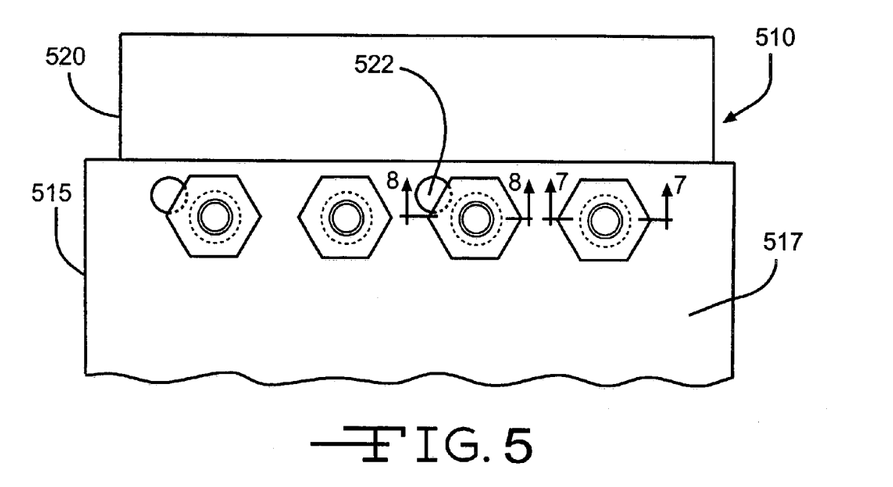
FIG. 5 is a view similar to FIG. 1 except showing a tube nut stop extending from the HCU.

An alternate embodiment of the invention is shown in FIG. 5, and Side A of FIG. 2 having a hydraulic manifold that is indicated generally at 510. The hydraulic manifold 510 includes a hydraulic control unit (HCU) 515 an electronic control unit (ECU) 520. The HCU 515 has a surface 517, which defines a plane. At least one stop 522 extends from the HCU 515. The stop 522 is substantially the same as the stop 22 described above, except that the shape and dimensions of the stop 522 are different. Particularly in this embodiment, the stop 522 is generally cylindrical as opposed to the generally rectangular design of the first stop 22. Additionally, the alternate stop 522 does not extend to the outer edge of the surface 517, as is best illustrated in FIG. 5. It is understood that, in accordance with the present invention, the stop can have any size, shape or position relative to the HCU. In a preferred embodiment, the stop 522 is composed of the same material as the HCU 515 and is formed as part of the surface 517. However, it is contemplated that the stop 522 may be composed of any suitable material and formed in any suitable way and attached to the HCU 515 by any suitable method. Alternatively, the stop can be formed on the ECU and extend therefrom.

Figure 6:
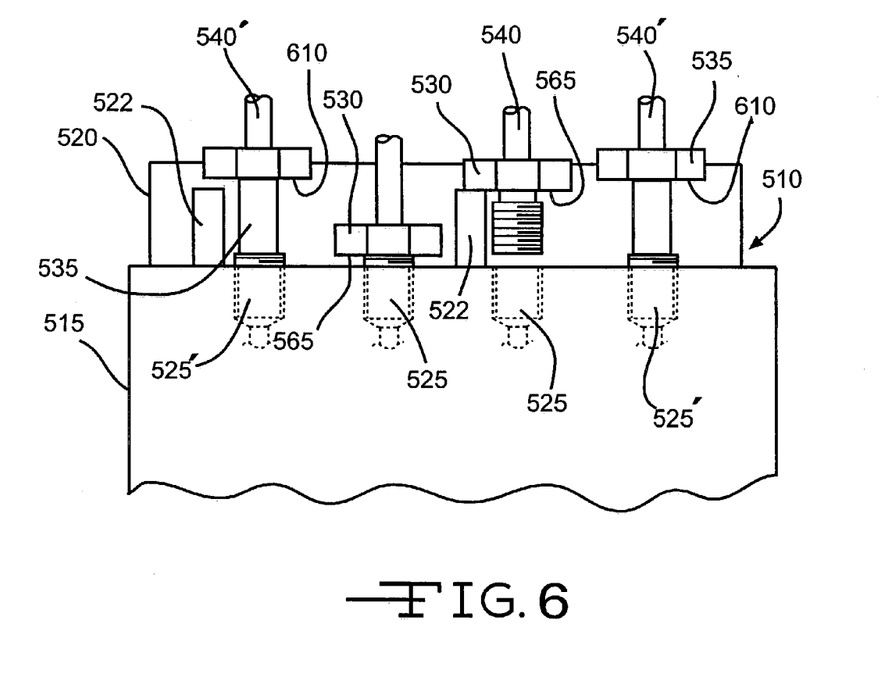
FIG. 6 is a side view of the hydraulic manifold of FIG. 5.

Referring to FIG. 6, a plurality of bores 525 and 525' are formed in the HCU 515. At least one first threaded connector in the form of a first tube nut 530 is provided. Each first tube nut 530 connects a respective tube 540 to the HCU 515 at a respective bore 525. At least one second threaded connector in the form of a second tube nut 535 is provided. Similarly each second tube nut 535 connects a respective tube 540' to the HCU 515 at a respective bore 525'. Each tube 540 and 540' provides a fluid passage connection between the HCU 515 and a remote hydraulic component (not shown), such as a vehicle brake.

Preferably, the tube 540 has an end 575 that is flared. However, one skilled in the art will appreciate that the end 575 of the tube 540 may be formed having any suitable shape. The bore 525 has been formed in such a way as to receive the end 575 of the tube 540, as indicated generally at 580. A plurality of threads 587 are formed on the surface 585. The plurality of threads 587 in the bore 525 are engaged by the plurality of threads 570 of the first tube nut 530 to threadably connect the first tube nut 530 to the HCU 515 at the bore 525.

Figure 7:
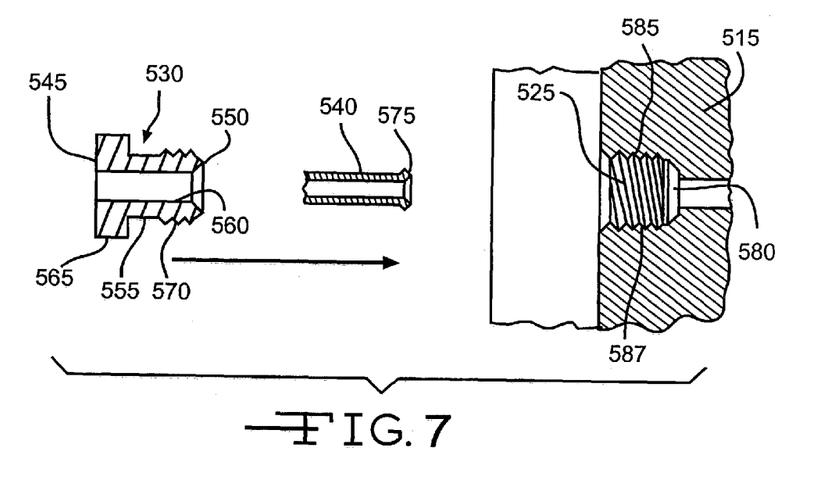
FIG. 7 is an exploded section view of the manifold taken along the line 7—7 of FIG. 5 and rotated 90° counterclockwise.

Referring to FIG. 7 the first tube nut, indicated generally at 530, is generally cylindrical in shape. The first tube nut 530 has a first end 545 and a second end 550. The first tube nut 530 has an exterior surface 555 and a radially outwardly extending flange 565. The flange 565 preferably has a plurality of flats or other tool engaging surface or surfaces formed on the exterior surface 555 at the first end 545 of the first tube nut 530. The first tube nut 530 also has an interior surface 560 defining the cylindrical bore through the tube nut 530 from the first end 545 to the second end 550 of the first tube nut 530. A plurality of threads 570 are formed on the exterior surface 555 at the second end 550 of the first tube nut 530. The threads could be formed only at the end of the tube nut 530, or along the entire length of the tube nut 530. The interior surface 560 of the first tube nut 530 is adapted to receive the tube 540 therethrough.

Figure 8:
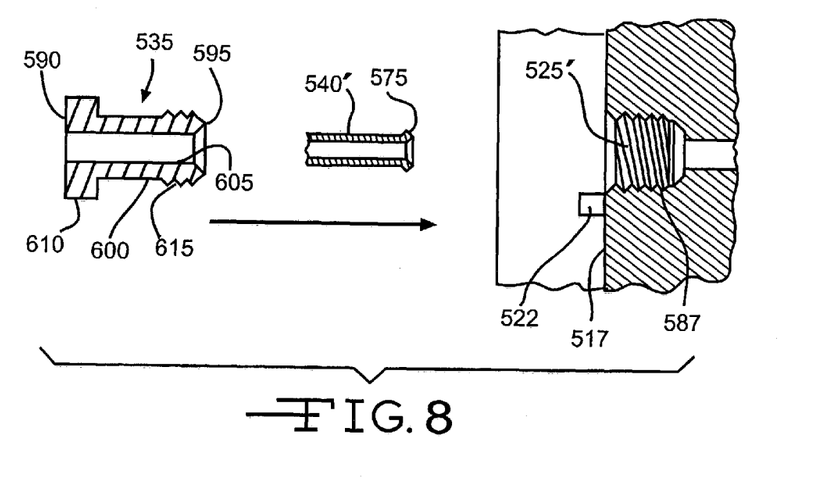
FIG. 8 is a view of the manifold similar to FIG. 7 taken along the line 8—8 of FIG. 5 and rotated 90° counterclockwise, showing a second tube nut and an associated tube being assembled into the HCU and showing a tube nut stop extending from the HCU.

Referring to FIG. 8 the second tube nut, indicated generally at 535, is generally cylindrical and hollow in shape. The second tube nut 535 has a first end 590 and a second end 595. The second tube nut 535 has an exterior surface 600 and an interior surface 605. A flange 610 is formed on the exterior surface 600 of the second tube nut 535 at the first end 590 of the second tube nut 535. A plurality of threads 615 are formed on the exterior surface 600 of the second tube nut 535 adjacent the second end 595 of the second tube nut 535. It should be understood that the threads could be formed along the length of the exterior surface 600, or only on a portion thereof. The interior surface 605 of the second tube nut 535 is formed in such a way to receive the tube 540'. The plurality of threads 587 on the bore 525' engage the plurality of threads 615 on the second tube nut 535 to threadably connect the second tube nut 535 to the HCU 515 at the bore 525'. The second tube nut 535 is preferably longer than the first tube nut 530. That is, the distance between the flange 610 and the second end 595 of the second tube nut 535 is greater than the distance between the flange 565 and the second end 550 of the first tube nut 530.

The stop 522 extends from the surface 517 in such a way so that when the second tube nut 535 is threadably connected to the HCU 515, the stop 522 is, at least partially, between the flange 610 and the surface 517. The stop 22 preferably has a height such that the stop 522 does not interfere with the proper connection of the second tube nut 535 to the HCU 515 into the bore 525' adjacent the stop 522. The term "height" is meant to refer to the distance away from the surface 517 that the stop 522 extends and is not intended as a limitation on the orientation of the components. The stop 522 is preferably of such a height such that the stop 522 does not allow the connection of the first tube nut 530 to the HCU 515 at any bore 525' next to which the stop 522 has been placed.

Figure 9:
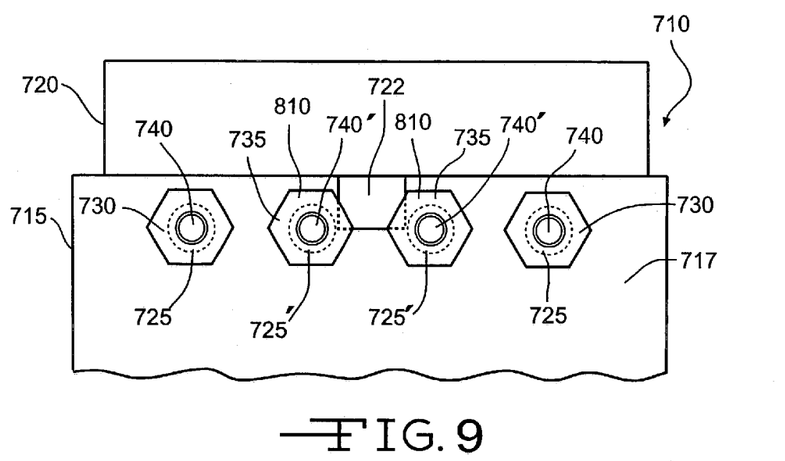
FIG. 9 is a view similar to FIG. 1 except showing a single tube nut stop being associated with two bores.

An alternate embodiment of the invention is shown in FIG. 9. A hydraulic manifold is indicated generally at 710. The hydraulic manifold 710 includes a hydraulic control unit (HCU) 715 and an electronic control unit (ECU) 720. The HCU 715 has a surface 717, which defines a plane. A stop 722, that is similar to the stop 22, extends from the ECU 720 over the surface 717. In a preferred embodiment, the stop 722 is formed integrally of the material of the exterior of the ECU 720. However, it can be appreciated that the stop 722 may be separately formed and fixed to the ECU 720. Alternatively, like the stop 522 described above, the stop 722 extends from the surface 717 and is formed from or fixed to the material of the HCU 715. A plurality of bores (not shown) are formed in the HCU 715. At least one first tube nut 730 and at least one second tube nut 735 are provided. A flange 810 is formed on the exterior surface of the second tube nut 735. Each first tube nut 730 connects a respective tube 740 to the HCU 715 at a respective bore 725. Similarly each second tube nut 735 connects a respective tube 740' to the HCU 715 at a respective bore 725'. Each tube 740 and 740' provides a respective fluid passage connection between the HCU 715 and a respective remote hydraulic component (not shown), such as a vehicle brake. Unlike the stops 22 and 522, which are disposed closely adjacent only one associated bore, the tube nut stop 722 is placed on the surface 717 so as to be disposed closely adjacent two associated bores. Thus the stop 722 is disposed between the surface 717 and the respective flange 810 of two of the second tube nuts 735 and functions to prevent connection of the tube nuts 730 to one of the bores closely adjacent the stops 722. This arrangement might be suitable, for example, where both the bores closely adjacent the stops 722 are cross connected internally to the HCU 717, such as "return to reservoir" lines, where it would not matter which tube nut 735 was connected to which bore closely adjacent the stop 722.

Figure 10:
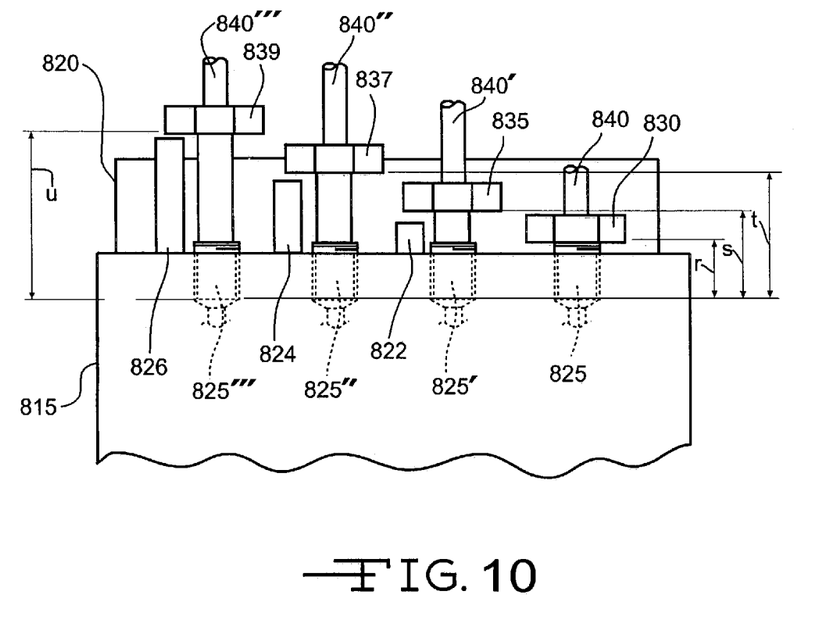
FIG. 10 is a side view of a hydraulic manifold featuring several tube nut stops of differing sizes to prevent misassembly in accordance with this invention.

While only two types of tube nuts (and one stop height) have been described in the disclosed embodiments, one skilled in the art will appreciate that a manifold may have three or more different lengths of tube nuts (and corresponding stops) to distinguish among a corresponding number of unique circuits. For example, illustrated in FIG. 10 are four tube nuts 840, 840', 840", and 840'". Each of the tube nuts has a unique lengths, r, s, t and u, respectively. Also shown are three stops 822, 824, and 826, each having a different length. Additionally, each stop 822, 824, and 826 being associated with a different tube nut 840', 840", and 840'", respectively. A user would recognize that unless only a small gap were left between the flange (flange 835, for example) of a tube nut 840' and the stop 822 closely adjacent the bore 825' in which the tube nut 840' was sealed, then the wrong tube nut has been inserted, if the tube nut could engage the bore at all.

Figure 11:
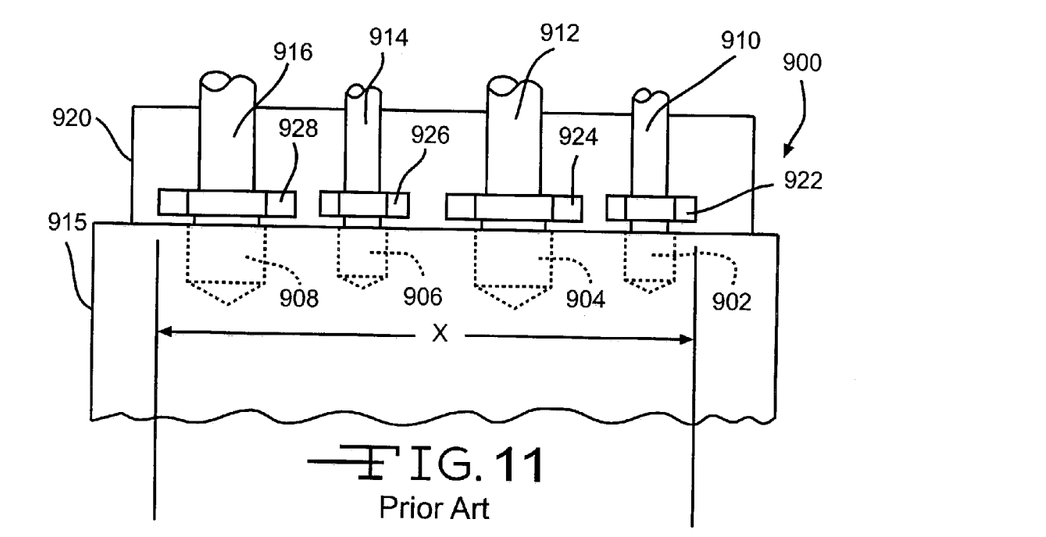
FIG. 11 is a side view of a typical prior art hydraulic manifold featuring dissimilar connection ports as a "foolproofing" feature to prevent misassembly.
Figure 12:
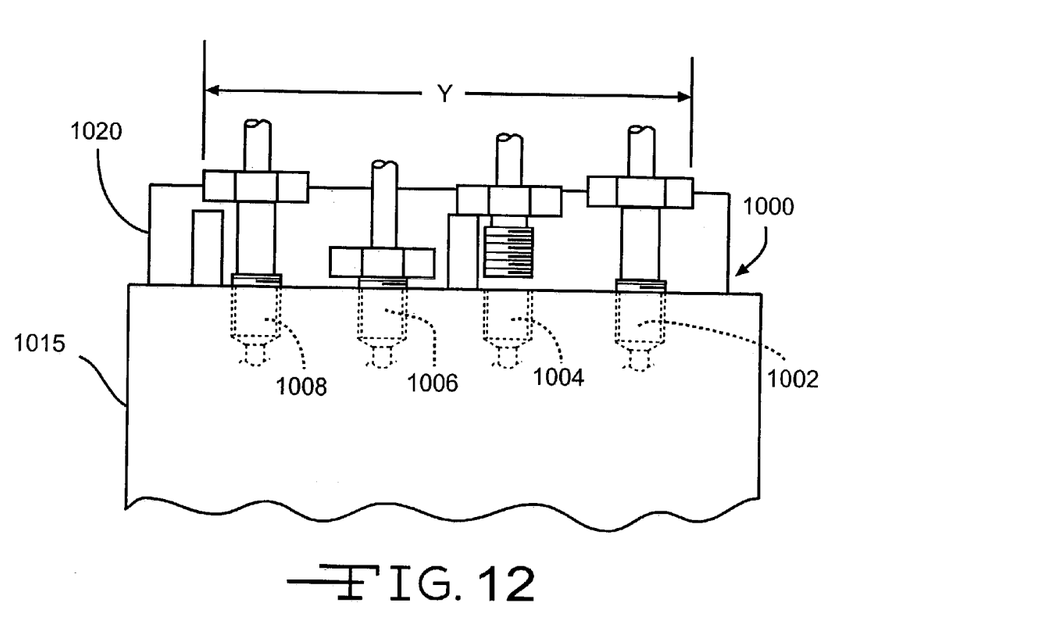
FIG. 12 is a side view of a hydraulic manifold featuring identical connection ports with tube nut stops to prevent misassembly in accordance with this invention.

Referring to FIGS. 11 and 12, this invention allows the use of common ports of minimum (optimum) size in close geometric proximity, and provides improved assembly tool clearance, and prevents misassembly. Particularly, in FIG. 11, a prior art hydraulic manifold is indicated generally at 900. The manifold 900 includes a hydraulic control unit (HCU) 920 and an electronic control unit (ECU) 915. A plurality of bores is formed in the HCU 920. The bores, 902, 904, 906, and 908, for different fluid circuits have different bore diameters. To reduce or eliminate mistakes in the connection of tube nuts to incorrect bores, the bore diameters being unique allow the user to quickly detect when a tube nut is improperly connected to a particular bore. Tube nut assemblies 910, 912, 914 and 916 are preferably adapted to fit into the bores 902, 904, 906, and 908, that correspond to the particular size of the tube nut assembly. As described above, the tube nuts preferably are generally cylindrical and hollow. Further, each tube nut has a threaded exterior surface and a flange positioned at one end of the tube nut. The tube nut has an interior surface adapted to receive a tube. However, as indicated, there is no tube stop with this embodiment and the foolproof nature of the invention is accomplished by the utilization of differently sized bores. However, due to the use of different sized bores, the overall space required, as indicated by the "x" dimension, is larger than optimum.

Thus, the illustrated embodiment shown in FIG. 12 depicts the benefits of the tube nut stop configuration according to the present invention. This embodiment is substantially similar to those embodiments described above, such as in FIG. 2 or FIG. 6. A hydraulic manifold is indicated generally at 1000. The manifold 1000 includes a hydraulic control unit (HCU) 1020 and an electronic control unit (ECU) 1015. A plurality of bores is formed in the HCU 1020. The bores, 1002, 1004, 1006, and 1008, for different fluid circuits have substantially the same sized bore diameters. As indicated by the "y" dimension, the overall space required by the bores and tube nut assemblies is reduced. The tube nut stops prevent the improper connection of a tube nut with the wrong bore, in accordance with the present invention, and as described above.

In summary, the structure of the invention includes a body with at least one bore defined therein and a tube nut stop. The tube nut stop is closely adjacent the bore so that a flange of the tube nut is sized to engage the flange of the first tube nut when the first tube nut is placed into the body at the bore. The tube nut stop thereby limits the ability of the tube nut to be placed into the bore. The tube nut stop is preferably of insufficient size to engage the flange of a second tube nut when the second tube nut is placed into the bore, thereby allowing the second tube nut to be placed into the bore.

The structure may also be embodied as a fluid system component with a surface defining a plane and a plurality of bores. Each bore is adapted to receive a tube nut therein and the plurality of bores extend into the fluid system component from the surface. The structure also includes a tube nut stop disposed adjacent at least one of said bores so as to engage a flange of a tube nut screwed into said fluid system component at one of said bores.

While the application of this invention in this disclosure has been described in the environment of an electromechanically controlled hydraulic brake system having an HCU and ECU, one of ordinary skill in the art will appreciate that the invention may be used with many other devices such as a fluid manifold, a pneumatic manifold, a valve body, or any other fluid system component to which more than one fluid connection must be made. Additionally, while this invention has been described as using tube nuts and tubes threadably connected to an associated fluid system component with multiple threaded bores formed therein, the invention could be practiced in other ways such as in a permanent assembly setting, where flanges could be formed at various respective distances from ends of respective tubes. The tubes could be fitted into various bores of an associated fluid system component, each bore having as associated stop closely adjacent each stop could having a respective height such that only when the proper tube was seated in the associated bore would a small gap be present between the flange of the tube and the facing surface of the stop. Once inserted, they could be permanently fixed in place such as welded, brazed, rolled, or by any other suitable means.

In accordance with the provisions of the patent statutes, the principle and mode of operation of this invention have been explained and illustrated in its preferred embodiment. However, it must be understood that this invention may be practiced otherwise than specifically explained and illustrated without departing from its spirit or scope.

What is claimed is:

1. A fluid manifold comprising:
a manifold body having a surface defining a plane;
a bore extending into the manifold body from the surface, the manifold body defining a seat in the bore wherein the bore is adapted to receive a tube nut into a seated position against the seat in the bore;
a first tube nut with a body having a first length and a first flange positioned at one end of the body of the first tube nut;
a second tube nut with a body having a second length and a second flange positioned at one end of the body of the second tube nut; and
a tube nut stop disposed adjacent the bore;
wherein the tube nut stop is sized to engage the flange of the first tube nut when the first tube nut is placed into the manifold at the bore thereby preventing the first tube nut from being seated against the seat in the bore; and
wherein the tube nut stop is of insufficient size to engage the flange of the second tube nut when the second tube nut is seated against the seat in the bore, thereby allowing the second tube nut to be seated against the seat in the bore.

2. The fluid manifold defined in claim 1 wherein the first length is less than the second length.

3. The fluid manifold defined in claim 1 wherein the tube nut stop has a height above the plane of the surface that is greater than the first length and less than the second length.

4. The fluid manifold defined in claim 3 wherein the tube nut stop is at least partially disposed between one of the first tube nut flange and the second tube nut flange, and the surface of the manifold.

5. The fluid manifold defined in claim 3 further comprising a hydraulic control unit and an electronic control unit, wherein the tube nut stop is integrally formed with the electronic control unit.

6. The fluid manifold defined in claim 3 further comprising a hydraulic control unit and an electronic control unit, wherein the tube nut stop is integrally formed with the hydraulic control unit.

7. The fluid manifold defined in claim 3 wherein the tube nut stop is a separate component fastened to the fluid manifold.

8. The fluid manifold defined in claim 1 further comprising a plurality of bores wherein each of the bores is identically shaped.

9. The fluid manifold defined in claim 8 wherein each of the bores has a uniform diameter and depth.

10. The fluid manifold defined in claim 9 wherein the tube nut stop is positioned on the surface of the manifold such that the tube nut stop is disposed adjacent more than one bore.

11. The fluid manifold defined in claim 1 wherein the manifold has a plurality of tube nut stops, wherein each of the tube nut stops has a different length.

12. The fluid manifold defined in claim 1 wherein the fluid manifold is one of a pneumatic manifold, an industrial fluid distribution manifold, and a three-way valve.

13. A fluid manifold comprising:
a manifold body having a surface defining a plane;
a plurality of bores extending into the manifold body from the surface, the manifold body defining a seat in each bore wherein each bore is adapted to receive a tube nut into a seated position against each seat in each bore;

at least one first tube nut with a body having a first length and a first flange positioned at one end of the body of the first tube nut;

at least one second tube nut with a body having a second length and a second flange positioned at one end of the body of the second tube nut; and a tube nut stop disposed closely adjacent more than one associated bore, wherein the tube nut stop is sized to engage the flanges of more than one of the first tube nuts when the first tube nuts are placed into the manifold at the associated bores thereby preventing the first tube nuts from being seated against the seats in the bores; and wherein the tube nut stop is of insufficient size to engage the flanges of more than one of the second tube nuts when the second tube nuts are seated against the seats in the associated bores, thereby allowing the second tube nuts to be seated against the seats in the bores.

14. A fluid manifold comprising:

a hydraulic control unit;

an electronic control unit;

a bore extending into the hydraulic control unit, the hydraulic control unit defining a seat in the bore wherein the bore is adapted to receive a tube nut into a seated position against the seat in the bore;

a first tube nut with a body having a first length and a first flange positioned at one end of the body of the first tube nut;

a second tube nut with a body having a second length and a second flange positioned at one end of the body of the second tube nut; and a tube nut stop, formed on and extending from, one of the hydraulic control unit and electronic control unit, the tube nut stop disposed adjacent the bore;

wherein the tube nut stop is sized to engage the flange of the first tube nut when the first tube nut is placed into the manifold at the bore thereby preventing the first tube nut from being seated against the seat in the bore; and wherein the tube nut stop is of insufficient size to engage the flange of the second tube nut when the second tube nut is seated against the seat in the bore, thereby allowing the second tube nut to be seated against the seat in the bore.

15. A fluid manifold comprising:

a manifold body having a surface defining a plane;

a plurality of bores extending into the manifold body from the surface, the manifold body defining a seat in each of the bores wherein the bores are adapted to receive a tube nut into a seated position against the seat in the bores;

a plurality of tube nuts, each tube nut with a body having a unique length and a flange positioned at one end of the body of each of the plurality of tube nuts; and a plurality of tube nut stops disposed adjacent each of the bores, wherein each tube nut stop has a unique length;

wherein each tube nut stop is sized to engage the flanges of all but one tube nut when the tube nuts are placed into the manifold at the bore thereby preventing all but one tube nut from being seated against the seat in the bore; and wherein each tube nut stop is of insufficient size to engage the flange of one tube nut when the one tube nut is seated against the seat in the bore, thereby allowing the one tube nut to be seated against the seat in the bore.

* * * * *